(12) United States Patent
Little et al.

(10) Patent No.: US 7,519,240 B1
(45) Date of Patent: Apr. 14, 2009

(54) MULTI-SECTION COUPLER TO MITIGATE GUIDE-GUIDE ASYMMETRY

(75) Inventors: Brent E. Little, Glen Head, NY (US); Wei Chen, Ellicott City, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/779,108

(22) Filed: Jul. 17, 2007

(51) Int. Cl.
*G02F 1/01* (2006.01)
(52) U.S. Cl. .................... 385/1; 385/2; 385/3; 385/4; 385/8; 385/9; 385/11; 385/14; 385/15; 385/27; 385/31; 385/45; 385/46
(58) Field of Classification Search .............. 385/1–4, 385/8, 9, 11, 14, 15, 27, 31, 45, 46
See application file for complete search history.

(56) References Cited

U.S. PATENT DOCUMENTS

| | | | |
|---|---|---|---|
| 4,493,528 A | 1/1985 | Shaw et al. | |
| 6,633,698 B2 * | 10/2003 | Hatayama et al. | 385/27 |
| 6,922,507 B2 * | 7/2005 | Doerr | 385/39 |
| 6,941,045 B2 | 9/2005 | Doerr | |
| 7,027,690 B2 * | 4/2006 | Chen et al. | 385/42 |
| 2002/0021856 A1 * | 2/2002 | Hatayama et al. | 385/15 |
| 2003/0021509 A1 * | 1/2003 | Yap et al. | 385/3 |

OTHER PUBLICATIONS

B. E. Little and Tom Murphy, "Design Rules for Maximally Flat Wavelength-Insensitive Optical Power Dividers Using Mach-Zehnder Structures," *IEEE Photonics Technology Letters*, vol. 9, No. 12, Dec. 1997, pp. 1607-1609.

* cited by examiner

*Primary Examiner*—Brian M. Healy
*Assistant Examiner*—Hung Lam
(74) *Attorney, Agent, or Firm*—Dunlap, Codding & Rogers, P.C.; Ross M. Carothers

(57) ABSTRACT

A wavelength independent multi-section optical coupler having at least three optical couplers, and at least two differential phase cells. Each optical coupler has two waveguides forming a coupling region having a net coupling value. The coupling value for each coupling region of the at least three optical couplers is different than the coupling values of the other two coupling regions. Each differential phase cell connects adjacent ones of said optical couplers. Each differential phase cell causes a differential phase shift in light signals traversing between the optical couplers, wherein the differential phase shifts of the differential phase cells, and the coupling value for each coupling region are chosen so as to minimize wavelength, and fabrication sensitivity of said wavelength independent multi-section optical coupler for a designed power splitting ratio.

8 Claims, 3 Drawing Sheets

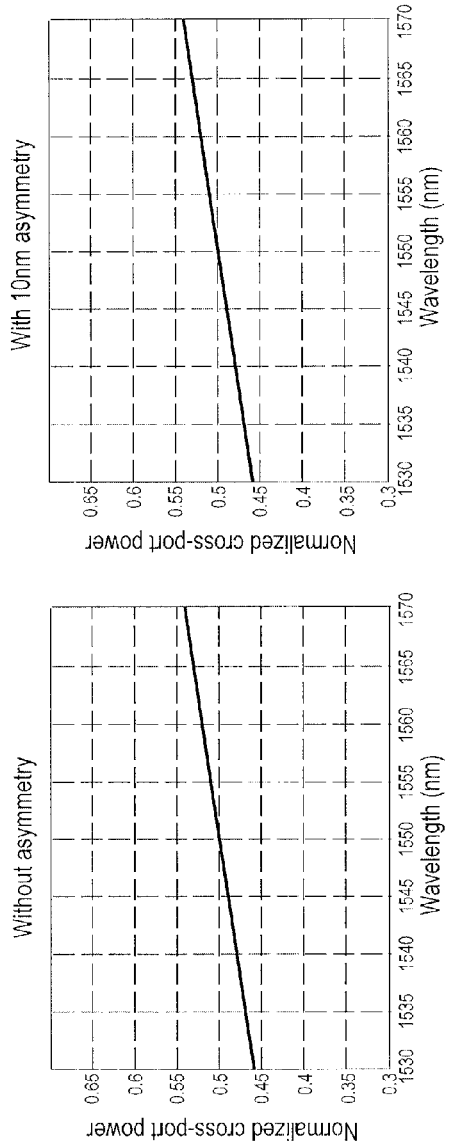
*Fig. 2A*
*Fig. 2B*
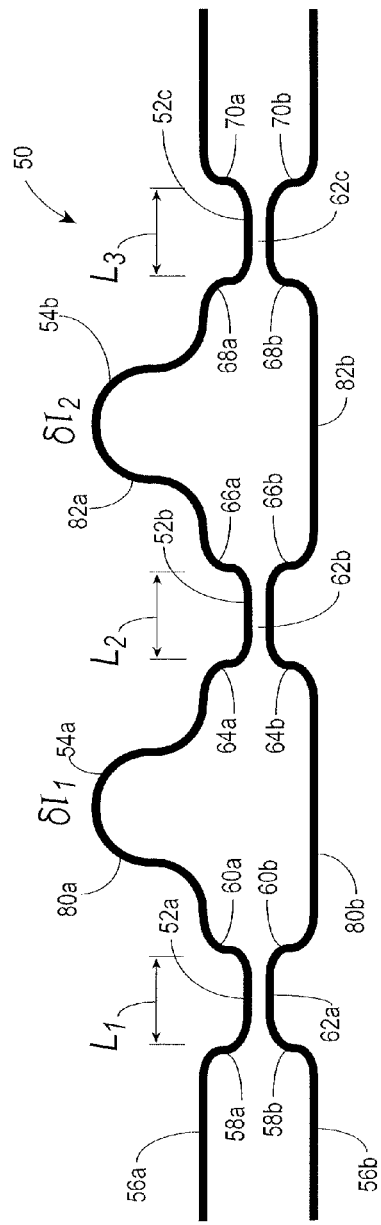
*Fig. 3*

MULTI-SECTION COUPLER TO MITIGATE GUIDE-GUIDE ASYMMETRY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE § 1.52(E)(5))

Not Applicable.

BACKGROUND OF THE INVENTION

A significant class of optical devices are commonly called "planar light-wave circuits" or "planar light-wave chips" or just PLCs. PLCs comprise technologies wherein optical components and networks are disposed monolithically within a stack or stacks of optical thin films supported by a common mechanical substrate such as a semiconductor or glass wafer. PLCs are typically designed to provide specific transport or routing functions for use within fiber-optic communications networks. These networks are distributed over a multitude of geographically dispersed terminations and commonly include transport between terminations via single-mode optical fiber. For a device in such a network to provide transparent management of the optical signals it must maintain the single-mode nature of the optical signal. As such, the PLCs are commonly, though not strictly, based on configurations of single-mode waveguides. Since optical signals do not require return paths, these waveguide configurations do not typically conform to the classic definition of "circuits", but due to their physical and functional resemblance to electronic circuits, the waveguide systems are also often referred to as circuits.

The standard family of materials for PLCs, widely demonstrated to have superior loss characteristics, is based on silicon dioxide, commonly called silica. The silica stack includes layers that may be pure silica as well as layers that may be doped with other elements such as Boron, Phosphorous, Germanium, or other elements or materials. The doping permits control of index-of-refraction and other necessary physical properties of the layers. Silica, including doped silica, as well as a few less commonly used oxides of other elements, are commonly also referred to collectively as "oxides." Furthermore, although technically the term "glass" refers to a state of matter that can be achieved by a broad spectrum of materials, it is common for "glass" to be taken to mean a clear, non crystalline material, typically $SiO_2$ based. It is therefore also common to hear of oxide waveguides being referred to as "glass" waveguides. Subsequently, the moniker "silica" is used to refer to those silicon oxide materials suitable for making waveguides or other integrated photonic devices. It is important to note that in the context of this invention, other waveguide materials, such as lithium niobate, spin-on glasses, silicon, siliconoxynitride, silicon oxycarbide, polymers or other materials described in U.S. Pat. No. 6,614,977 (the entire content of which is hereby incorporated herein by reference), are also appropriate In a typical example of a PLC, a waveguide formed of a core material lies between a top cladding layer and a bottom cladding layer. In some instances, a top cladding may not be used. Waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. In this example, each layer is doped in a manner such that the waveguide has a higher index of refraction than either the top cladding or bottom cladding. When layers of silica glass are used for the waveguide, the layers are typically situated on a silicon wafer. As a second example, waveguides can comprise three or more layers of InGaAsP. In this example, adjacent layers have compositions with different percentages of the constituent elements In, P, Ga, and As. As a third example, one or more of the optical layers of the waveguide may comprise an optically transparent polymer. Another example of a waveguide comprises a layer with a graded index such that the region of highest index of refraction is bounded by regions of lower indices of refraction. A doped-silica waveguide is usually preferred because it has a number of attractive properties including low cost, low loss, low birefringence, stability, and compatibility for coupling to fiber.

Many integrated optical devices require the creation of physical structures that are highly symmetric. A key example is a planar waveguide coupler consisting of two optical waveguides coupled to each other across a gap. In many cases, the achievement of highest performance in such a coupler requires the two waveguides to be identical to each other. A conventional approach to achieving this goal is to define the optical waveguides using a photolithography and etching process with a pattern consisting of two waveguides of identical cross section separated by a gap. In this scheme, the fabrication of identical guides relies upon very high fidelity in the lithography and etching processes to reproduce the identical mask patterns into the optical waveguides. This strategy will allow integrated optical couplers to be fabricated with a certain level of performance that may be adequate for some types of devices. However, the ultimate performance may be limited due to asymmetries induced by the fabrication process.

BRIEF SUMMARY OF THE INVENTION

In general, the present invention relates to a wavelength independent multi-section optical coupler, comprising at least three optical couplers and at least two differential phase cells. Each optical coupler has two waveguides forming a coupling region having a net coupling value. The coupling value for each coupling region of the at least three optical couplers is different than the coupling values of the other two coupling regions. Each differential phase cell connects adjacent ones of said optical couplers. Each differential phase cell causes a differential phase shift in light signals traversing between the optical couplers, wherein the differential phase shifts of the differential phase cells, and the coupling value for each coupling region are chosen so as to minimize wavelength, and fabrication sensitivity of said wavelength independent multi-section optical coupler for a designed power splitting ratio.

In one version of the present invention, each of the first and second differential phase cells has a first waveguide branch, and a second waveguide branch. The first waveguide branch has a first pathlength ($P_1$) and the second wavelength branch has a second pathlength ($P_2$) where $P_1>P_2$. Typically, the difference between $P_1$ and $P_2$ is less than about one wavelength of an optical signal traversing said first and second waveguide branches.

In a preferred aspect of the invention, a deviation in normalized cross-port power of the wavelength independent optical coupler is less than 2% from a desired power splitting ratio for wavelengths between 1530 nm and 1570 nm and with asymmetry between the waveguides forming the coupling region between ±30 nm. In an even more preferred aspect of the invention, a deviation in normalized cross-port power of the wavelength independent optical coupler is less than 1% from a desired power splitting ratio for wavelengths between 1530 nm and 1570 nm and with asymmetry between the waveguides forming the coupling region between ±30 nm.

In another version, the present invention is directed to a method of fabricating a wavelength independent multi-section optical coupler, having at least three optical couplers and at least two differential phase cells. In the method, differential phase shifts of the differential phase cells, and a unique net coupling value for each coupling region are calculated so as to minimize wavelength, and fabrication sensitivity of said wavelength independent multi-section optical coupler for a designed power splitting ratio. Then, at least three optical couplers and at least two differential phase cells are formed such that the differential phase cells are interleaved between the optical couplers, with each optical coupler having two waveguides forming a coupling region having the net coupling value, and with each differential phase cell causing a differential phase shift in light signals traversing between the optical couplers.

In one aspect, the step of forming is defined further as forming each differential phase cell with a first waveguide branch, and a second waveguide branch, the first waveguide branch having a first pathlength ($P_1$) and the second wavelength branch having a second pathlength ($P_2$) where $P_1>P_2$. In yet another aspect, the step of calculating the differential phase shifts is defined further as calculating $P_1$ and $P_2$ to be less than about one wavelength of an optical signal traversing said first and second waveguide branches.

BRIEF DESCRIPTION OF THE SEVERAL VIEWS OF THE DRAWING

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 2a is a chart of a simulation conducted on the performance of the one-section directional coupler depicted in FIG. 2 having a 3 dB splitting ratio, and assuming that the two waveguides have identical widths.

FIG. 2b is a chart of a simulation conducted on the performance of the one-section directional coupler depicted in FIG. 2 having a 3 dB splitting ratio, and assuming that the widths of the waveguides differ by 10 nm.

FIG. 3 is a schematic diagram of a multi-section coupler constructed in accordance with the present invention.

DETAILED DESCRIPTION OF THE INVENTION

Figure 1:
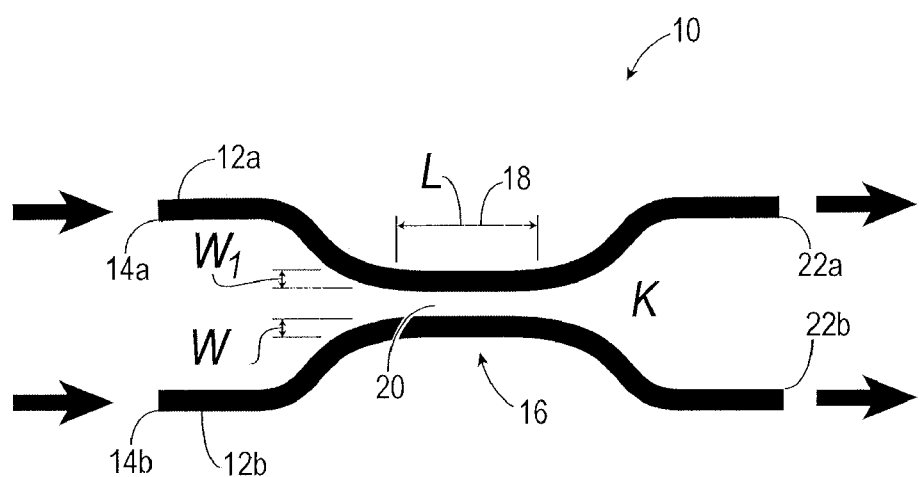
FIG. 1 is a schematic diagram of a prior art one-section directional coupler formed of two waveguides.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

Referring now to the drawings and in particular to FIG. 1, shown therein is a one-section prior art directional coupler 10. The directional coupler 10 is one of the fundamental building blocks in realizing highly integrated planar lightwave circuits. The directional coupler 10 is provided with two waveguides 12a and 12b that form one or more inputs 14a and 14b, a coupling region 16 having a length 18 (also referred to herein as length L), and a gap 20 between the waveguides 12a and 12b, and one or more outputs 22a and 22b. Each of the waveguides 12a and 12b are also provided with a width W1 and W2.

If the widths W1 and W2 of the two coupling waveguides are identical, the directional coupler 10 is categorized as a symmetrical directional coupler. The symmetrical directional coupler's net coupling value can be written as the matrix shown in Eq. 1, where K is the coupling coefficient and L is the length of the coupler.

$$T = \begin{bmatrix} \cos(K \cdot L) & -i \cdot \sin(K \cdot L) \\ -i \cdot \sin(K \cdot L) & \cos(K \cdot L) \end{bmatrix} \quad \text{Eq. 1}$$

The net coupling value T of the directional coupler 10 is a function of both the coupling strength K (interaction strength between two waveguides) and L the length of the coupling region. One can achieve the same net coupling value T (say 50%) by choosing different values for the coupling strength K and the length L. For instance, If the gap between the two waveguides becomes larger, the coupling strength K decreases, but this can be compensated for by making the coupling length L longer and still achieve the same net coupling value.

In the large scale integration of planar waveguide circuits, each individual coupler 10 needs to be working at the designed coupling ratio, i.e. cos(KL). However, because of process variation, namely the gap dimension variation, the coupling ratio cannot be very accurately controlled during the manufacturing process. The coupling coefficient is also a strong function of wavelength because of modal dispersion in the waveguides, thus making coupling ratio varying across the desired operation band.

FIG. 2a is a chart of a simulation conducted on the performance of the one-section directional coupler 10 depicted in FIG. 1 having a 3 dB splitting ratio, and assuming that the two waveguides 12a and 12b have identical widths $W_1$ and $W_2$. FIG. 2b is a chart of a simulation conducted on the performance of the one-section directional coupler 10 depicted in FIG. 1 having a 3 dB splitting ratio, and assuming that the widths $W_1$ and $W_2$ of the waveguides 12a and 12b, respectively, differ by 10 nm. It can be seen that changes in wavelength of the optical signal traversing the coupler 10 from 1530 nm to 1570 nm also changes the normalized cross port power of the directional coupler 10.

Referring to FIG. 3, shown therein and designated by a reference numeral 50 is a wavelength independent multi-section optical coupler constructed in accordance with the present invention. The wavelength independent multi-section optical coupler 50 may be referred to hereinafter as the "multi-section coupler 50". In general, the multi-section coupler 50 has an input port to receive a light signal having an input power and at least two output ports with each receiving a division of the input power of the light signal. In a preferred embodiment, the coupler 50 is bi-directional or reversible, i.e., the coupler 50 works the same if the output ports become the input ports. Also, in the preferred embodiment, the coupler 50 is polarization insensitive.

The multi-section coupler 50 includes at least three optical couplers which are constructed in a similar manner as the optical coupler 10 described above, and which are designated in FIG. 3 by the reference numerals 52a, 52b and 52c for purposes of clarity. Optical couplers 52a, 52b and 52c each have lengths $L_1$, $L_2$ and $L_3$, respectively. The multi-section coupler 50 also includes at least two differential phase cells 54. The differential phase cells 54 are labeled by the reference numerals 54a and 54b for purposes of clarity. The differential phase cells 54a and 54b are interleaved between the at least three optical couplers 52a, 52b, and 52c. The optical couplers 52a, 52b and 52c are constructed from a first waveguide 56a and a second waveguide 56b. Each optical coupler 52a, 52b, and 52c has two input ports, two output ports and a coupling region where an optical signal couples between the first and second waveguides 56a and 56b. In particular, optical coupler 52a has first and second input ports 58a and 58b, first and second output ports 60a and 60b, and coupling region 62a, optical coupler 52b has first and second input ports 64a and 64b, first and second output ports 66a and 66b, and coupling region 62b, and optical coupler 52c has first and second input ports 68a and 68b, first and second output ports 70a and 70b, and coupling region 62c. The coupling regions 62a, 62b, and 62c have net coupling values $T_1$, $T_2$, and $T_3$, respectively, as described above. The net coupling values $T_1$, $T_2$, and $T_3$ for each coupling region 62a, 62b and 62c of the at least three optical couplers 52a, 52b and 52c preferably are each different from each other.

Each differential phase cell 54a and 54b connects adjacent ones of said optical couplers 52a, 52b and 52c. For example, the differential phase cell 54a connects the first and second output ports 60a and 60b of the optical coupler 52a with the first and second input ports 64a and 64c, respectively, of the optical coupler 52b, while the differential phase cell 54b connects the first and second output ports 66a and 66b of the optical coupler 52b with the first and second input ports 68a and 68b, respectively, of the optical coupler 52c.

One of the first and second input ports 58a and 58b of the optical coupler 52a forms the input port of the multi-section coupler 50 to receive the light signal, and the first and second output ports 70a and 70b of the optical coupler 52c form the output ports of the multi-section coupler 50. Each differential phase cell 54a or 54b causes a differential phase shift in light signals traversing between the optical couplers. As will be described in more detail below, the differential phase shifts of the differential phase cells, and the net coupling value for each coupling region 62a, 62b and 62c are chosen so as to minimize wavelength, and fabrication sensitivity of said wavelength independent multi-section optical coupler for a designed power splitting ratio. Thus, the multi-section coupler 50 is designed to mitigate imperfections or asymmetries formed through the fabrication process, and the algorithms for designing the multi-section coupler 50 assumes that the imperfections are uniform across the optical couplers 52a, 52b and 52c.

Each of the first and second differential phase cells 54a and 54b has a first waveguide branch, and a second waveguide branch. In particular, first differential phase cell 54a has a first waveguide branch 80a and a second waveguide branch 80b; and second differential phase cell 54b has a first waveguide branch 82a and a second waveguide branch 82b. The first waveguide branches 80a and 82a each have a first pathlength ($P_1$) and the second wavelength branches 80b and 82b each have a second pathlength ($P_2$), where $P_1 > P_2$, and which form a pathlength difference $\delta l_1$ (i.e., $P_1 - P_2$) for the first differential phase cell 54a, and a pathlength difference $\delta l_2$ for the second differential phase cell 54a. The pathlength differences $\delta l_1$ and $\delta l_2$ are selected so that the first and second differential phase cells 54a and 54b will not perform a filtering function on an optical signal traversing the first and second differential phase cells 54a and 54b. Typically the pathlength differences $\delta l_1$ and $\delta l_2$ are less than about one wavelength of an optical signal traversing said first waveguide branches 80a and 82a and second waveguide branches 80b and 82b, however, in some instances the differences between $P_1$ and $P_2$ can be more than one wavelength of an optical signal traversing said first waveguide branches 80a and 82a, and second waveguide branches 80b and 82b, respectively.

The first waveguide branches 80a and 82a, and second waveguide branches 80b and 82b, respectively, of the differential phase cells 54a and 54b can be constructed in any manner capable of causing a phase shift between the optical signal traversing the first waveguide branches 80a and 82a and second waveguide branches 80b and 82b, respectively, without causing a filtering function. For example, the first waveguide branches 80a and 82a and/or second waveguide branches 80b and 82b, can have a same length, but be constructed of different materials, or the first waveguide branches 80a and 82a and/or second waveguide branches 80b and 82b can have a same length and be constructed of the same materials, but a medium, such as heat or pressure can be applied to one of the first waveguide branches 80a and 82a and/or second waveguide branches 80b and 82b, to cause a predetermined phase shift.

Figure 4A:
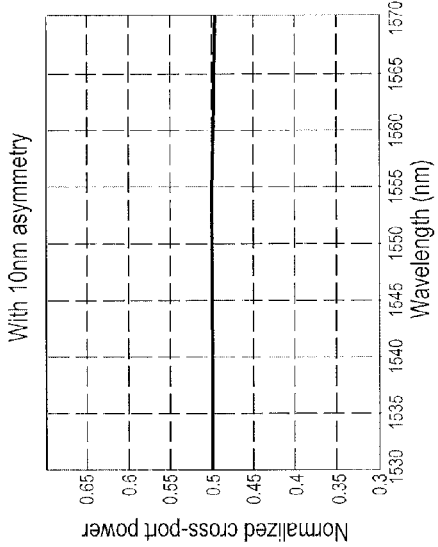
FIG. 4a is a chart of a simulation conducted on the performance of the multi-section coupler depicted in FIG. 4 having a 3 dB splitting ratio, and assuming that the waveguides forming the multi-section coupler have identical widths.
Figure 4B:
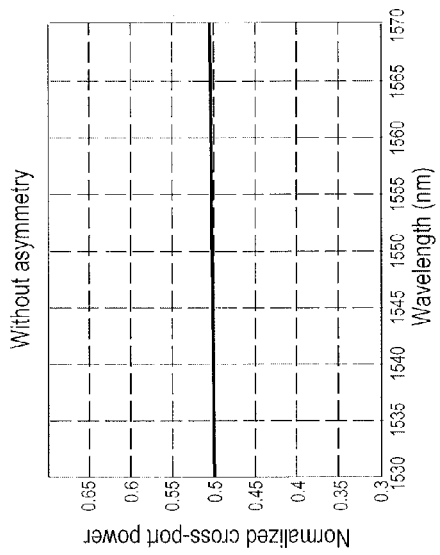
FIG. 4b is a chart of a simulation conducted on the performance of the multi-section coupler depicted in FIG. 4 having a 3 dB splitting ratio, and assuming that the widths of the waveguides forming the multi-section coupler differ by 10 nm.

FIG. 4a is a chart of a simulation conducted on the performance of the multi-section coupler 50 depicted in FIG. 3 having a 50/50 splitting ratio, and assuming that the waveguides 56a and 56b forming the multi-section coupler 50 have identical widths FIG. 4b is a chart of a simulation conducted on the performance of the multi-section coupler 50 depicted in FIG. 3 having a 50/50 splitting ratio, and assuming that the widths of the waveguides 56a and 56b forming the multi-section coupler 50 differ by 10 nm.

As shown in FIGS. 4a and 4b, the deviation in normalized cross-port power of the multi-section optical coupler 50 is less than 2% (and more desirably less than 1%) from a desired power splitting ratio, e.g. 50/50, for wavelengths between 1530 nm and 1570 nm and with asymmetry between the waveguides 56a and 56b forming the coupling region between ±10 nm. In general, utilizing the design parameters discussed hereinafter, the deviation in normalized cross-port power of the multi-section optical coupler 50 can vary, but is desirably less than 5% from a designed splitting ratio. Further, the amount of asymmetry between the waveguides forming the coupling region that the design can tolerate can vary, but is typically within a range of ±50 nm.

Each of the design parameters, $T_1$, $T_2$, $T_3$, $\delta l_1$, and $\delta l_2$ are used in constructing the multi-section coupler 50. The values of $T_1$, $T_2$, $T_3$, $\delta l_1$, and $\delta l_2$ are optimized to make the multi-section coupler 50 close to the designed coupling ratio (50/50, 60/40, 70/30, etc.) under conditions described by 9 sets of parameters: $\{\{K-\Delta K, K, K+\Delta K\} \{-\Delta w, 0, +\Delta w\}\}$; where $\Delta w$ is the degree of asymmetry between 2 coupler waveguides; and $\Delta K$ is the deviation of coupling ratios from design value.

The 9 sets of parameters can be expanded as: $\{K-\Delta K/-\Delta w\}$, $\{K-\Delta K/0\}$, $\{K-\Delta K/+\Delta w\}$, $\{K/-\Delta w\}$, $\{K/0\}$, $\{K/+\Delta w\}$, $\{K+\Delta K/-\Delta w\}$, $\{K+\Delta K/0\}$, $\{K+\Delta K/+\Delta w\}$. They exhaust the possible combinations between coupling ratio and degree of asymmetry. The optimization can be done using any suitable routine for simultaneously solving multi-variable problems, such as a nonlinear least square fit.

Alternatively, design parameters for the $L_1$, $L_2$, and $L_3$ of the coupling regions can be substituted for the net coupling values T1, T2 and T3 by designing the width of the gap between the waveguides 56a and 56b in the coupling regions 62a, 62b and 62c to be a uniform value, or the design parameters $L_1$, $L_2$ and $L_3$ can be set at a same value and the width of the gap varied.

Figure 5:
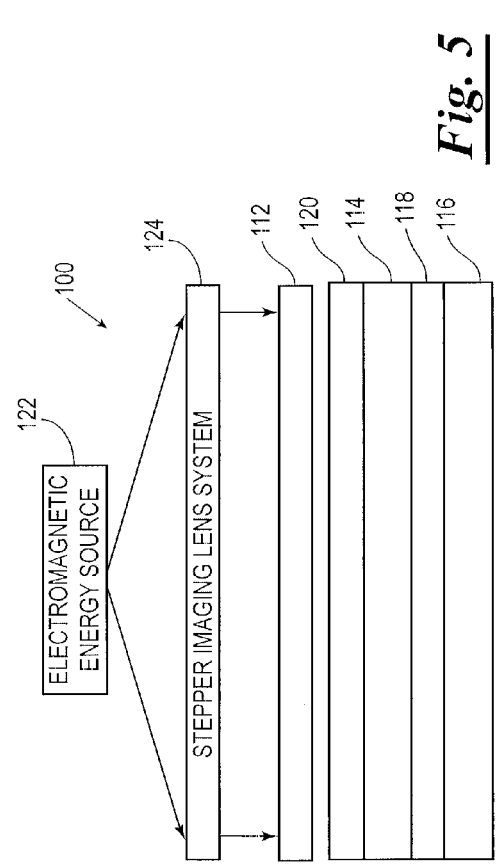
FIG. 5 is a diagrammatic view of an exemplary photolithography system for transferring patterns on a photomask to a thin film optical material on a substrate in accordance with the present invention.

Referring now to FIG. 5, the multi-section coupler 50 can be implemented as a part of an integrated planar lightwave circuit utilizing any fabrication technology known in the art. For example, shown in FIG. 5 and designated by a reference numeral 100 is an exemplary photolithography system for transferring patterns on a photomask 112 to a core material 114 on a substrate 116 in accordance with the present invention for making an integrated planar lightwave circuit having the multi-section coupler 50. In one embodiment, the core material 114 is a thin film constructed of a material selected from a group consisting of silicon, silicon nitride, silicon oxynitride, silicon oxycarbide, germanium doped silica, Indium Phosphide, Gallium Arsenide, high index polymers, and combinations thereof. The core material 114 is deposited on a cladding material 118 constructed of a material having an index of refraction that is lower than the index of refraction of the core material 114. The cladding material 118 can be selected from a group consisting of silica, lower index silicon oxynitride, lower index silicon oxycarbide, Indium Galium Arsenide Phosphide, polymers, and combinations thereof. Various examples of combinations of thin film optical materials and claddings suitable (and methods of making same) for forming the core material 114 and cladding material 118 are discussed in U.S. Pat. No. 6,614,977, the entire content of which is hereby incorporated herein by reference.

A photoresist layer 120 is disposed on the core material 114. In general, the photoresist layer 120 is constructed of a material that prevents material beneath the photoresist layer 120 from being removed or material directly underneath the photoresist layer 120 to be removed during a subsequent process for removing predetermined parts of the core material 114, such as an etching process. Thus, the photoresist layer 120 can be either a positive photoresist or a negative photoresist. The present invention will be described herein by way of example as the photoresist layer 120 being a positive photoresist. The photoresist layer 120 can be provided on the core material 114 utilizing any suitable process, such as spin coating.

The photolithography system 100 is also provided with an electromagnetic energy source 122 directing energy through a stepper imaging lens system 124 and the photomask 112 to the photoresist layer 120. The electromagnetic energy source 122 provides electromagnetic energy capable of reacting with the photoresist layer 120 to transfer the pattern on the photomask 112 to the photoresist layer 120. In one embodiment, the electromagnetic energy source 122 can be a high intensity ultraviolet light source.

The stepper imaging lens system 124 receives the electromagnetic energy from the electromagnetic energy source 122 and directs such energy to the photomask 12 which exposes parts of the photoresist layer 120 to the electromagnetic energy. Such exposure can be by any suitable method, such as contact, proximity, and projection.

Once the photoresist layer 120 has been exposed, then such photoresist layer 120 is developed to form a mask having a complex layout/geometry including the multi-section coupler 50 and other parts of an integrated planar lightwave circuit.

Once the mask is formed, then the pattern formed by the mask is transferred into the core material 114 to form the optical waveguides forming the multi-section coupler 50. In one preferred embodiment, the multi-section coupler 50 is formed as two waveguides having serpentine patterns and spaced apart a predetermined amount in the coupling regions as shown in FIG. 3. The transferring can be accomplished by any suitable process, such as an etching process. It should be understood that the optical waveguides forming the PLCs referred to herein may be formed using standard or later developed techniques used in the semiconductor industry to deposit and pattern optical waveguide materials, e.g., (dry-etch, wet-etch, flame hydrolysis deposition (FHD), chemical vapor deposition (CVD), reactive ion etching (RIE), physically enhanced CVD (PECVD), or the like. Once the waveguides are formed, the mask is removed, and another layer of cladding material (not shown) can then be deposited over the entire surface and planarized if necessary utilizing any suitable process. For example, a process for applying another layer of cladding material is discussed in U.S. Pat. No. 6,768,828 entitled "Integrated Optical Circuit With Dense Planarized Cladding Layer"; the entire content of which is hereby expressly incorporated herein by reference.

While the above methods for fabricating the multi-section coupler 50 of the present invention are described above in terms of fabricating one multi-section coupler 50, it should be apparent to those skilled in the art that such fabrication methods, as well as any other appropriate fabrication techniques currently known in the art or later developed, can be utilized to fabricate one or more of the multi-section couplers 50, or portions thereof, such as when one or more multi-section couplers 50 are included on a chip, or on a wafer (e.g., a silicon wafer) having a plurality of chips.

In one example, the following design parameters are used to design the multi-section optical coupler 50:

Core index 1.55, Cladding index=1.45, nominal waveguide dimension 2×2 micron$^2$, Polarization: TE, K=0.008 (rad/um), $\Delta K$=0.0003 (rad/um), and $\Delta W$=20 nm. Based on these design parameters, the following dimensions for the multi-section optical coupler 50 can be calculated as discussed above: $L_1$=92.4 nm, $L_2$=177.7 nm, $L_3$=159.6 nm, $\delta l_1 = 0.661$ nm, and $\delta l_2 = 0.896$ nm. The multi-section coupler 50 using these design parameters can tolerate +/−20 nm of asymmetries between the coupler waveguides.

It will be understood from the foregoing description that various modifications and changes may be made in the preferred and alternative embodiments of the present invention without departing from its true spirit. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An optical device, comprising:
   a first optical coupler including a first pair of waveguides separated by a first gap, the first pair of waveguides defining a first coupling region;
   a second optical coupler including a second pair of waveguides separated by a second gap, the second pair of waveguides defining a second coupling region;
   a third optical coupler including a third pair of waveguides separated by a third gap, the third pair of waveguides defining a third coupling region, the first, second and third gaps being substantially different from one another such that the first, second and third couplers have substantially different net coupling values;
   a first differential phase cell provided between the first and second optical couplers, the first differential phase cell including first and second waveguides, and imparting a first differential phase shift between first optical signals propagating in the first and second waveguides of the first differential phase cell; and
   a second differential phase cell provided between the second and third optical couplers, the second differential phase cell including first and second waveguides, and imparting a second differential phase shift between second optical signals propagating in the first and second waveguides of the second differential phase cell.

2. The optical device of claim 1, wherein each of the first and second differential phase cells has a first waveguide branch, and a second waveguide branch, the first waveguide branch having a first pathlength and the second wavelength branch having a second pathlength, where the first pathlength is greater than the second pathlength.

3. The optical device of claim 2, wherein the difference between the first pathlength and the second pathlength is less than about one wavelength of an optical signal traversing said first and second waveguide branches.

4. The optical device of claim 1, wherein a deviation in normalized cross-port power of the optical device is less than 2% from a desired power splitting ratio for wavelengths between 1530 nm and 1570 nm and with an asymmetry between the first and second waveguides of each of the first, second and third optical couplers being between ±30 nm.

5. A method of fabricating an optical device, the method comprising the steps of:
   calculating a first and second differential phase shift, and a first, second and third net coupling value, the first, second and third net coupling values being substantially different from one another;
   forming a first optical coupler having the first net coupling value, the first optical coupler including a first pair of waveguides separated by a first gap;
   forming a second optical coupler having the second net coupling value, the second optical coupler including a second pair of waveguides separated by a second gap;
   forming a third optical coupler having the third net coupling value, the third optical coupler including a third pair of waveguides separated by a third gap, the first, second and third gaps being substantially different from one another;
   forming a first differential phase cell between the first and second optical couplers, the first differential phase cell including first and second waveguides, and imparting the first differential phase shift value between first optical signals propagating in the first and second waveguide of the first differential phase cell; and
   forming a second differential phase cell between the second and third optical couplers, the second differential phase cell including first and second waveguides, and imparting the second differential phase shift between second optical signals propagating in the first and second waveguides of the second differential phase cell.

6. The method of claim 5, wherein the steps of forming the first and second differential phase cells includes forming each of the first and second differential phase cells with a first waveguide branch, and a second waveguide branch, the first waveguide branch having a first pathlength and the second wavelength branch having a second pathlength where the first pathlength is greater than the second pathlength.

7. The method of claim 6, wherein the step of calculating the first differential phase shift includes calculating the first pathlength and the second pathlength of the first differential phase cell to be less than about one wavelength of the first optical signals traversing the first and second waveguide branches of the first differential phase cell, and the step of calculating the second differential phase shift includes calculating the first pathlength and the second pathlength of the second differential phase cell to be less than about one wavelength of the second optical signals traversing the first and second waveguide branches of the second differential phase cell.

8. The method of claim 5, wherein a deviation in normalized cross-port power of the optical device is less than 2% from a desired power splitting ratio for wavelengths between 1530 nm and 1570 nm and with an asymmetry between the first and second waveguides forming the coupling region of each of the first, second and third optical couplers being between ±30 nm.

* * * * *